Sept. 4, 1951 W. A. RAY 2,567,123
SAFETY VALVE STRUCTURE FOR FUEL BURNERS
Filed Nov. 22, 1948 4 Sheets-Sheet 1

WILLIAM A. RAY,
INVENTOR.

BY John Flam
ATTORNEY

Sept. 4, 1951 W. A. RAY 2,567,123
SAFETY VALVE STRUCTURE FOR FUEL BURNERS
Filed Nov. 22, 1948 4 Sheets-Sheet 2
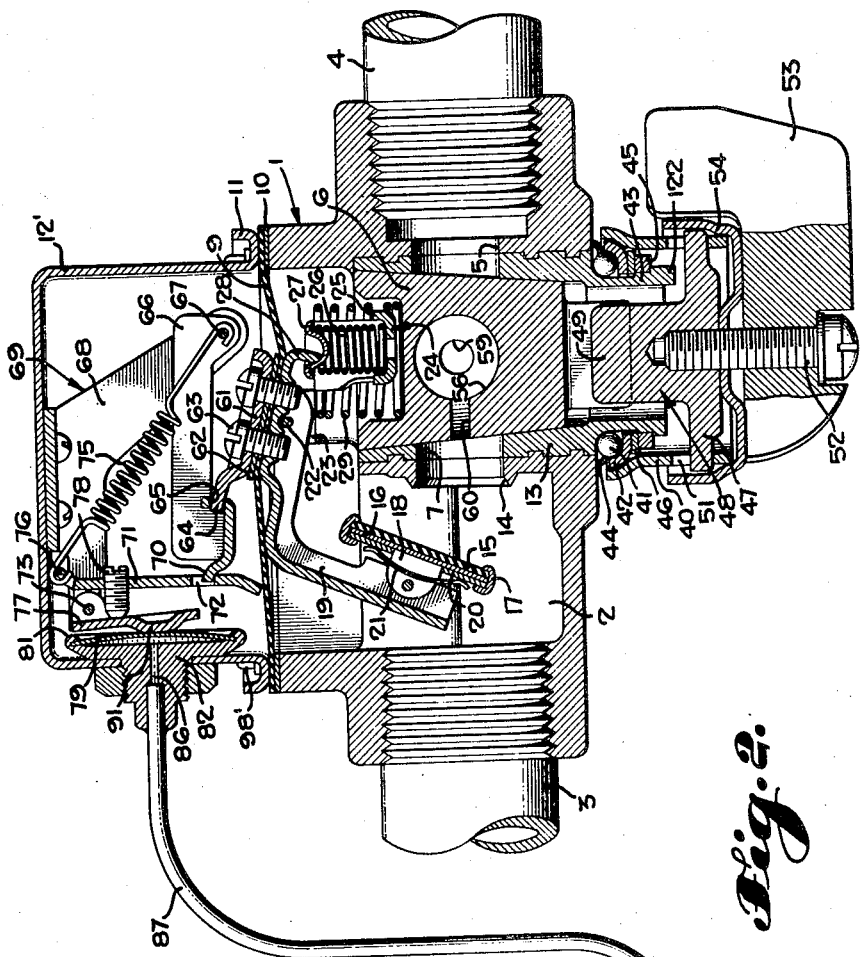
Fig. 2.
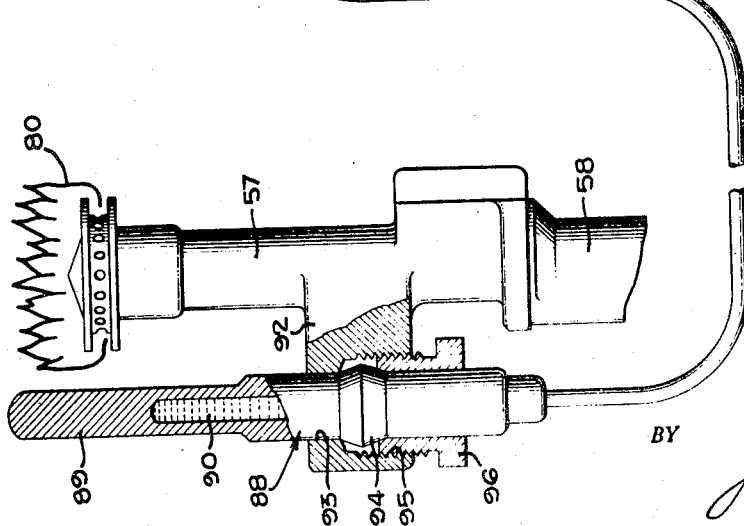
WILLIAM A. RAY,
INVENTOR.
BY
John Flam
ATTORNEY.

Sept. 4, 1951 W. A. RAY 2,567,123
SAFETY VALVE STRUCTURE FOR FUEL BURNERS
Filed Nov. 22, 1948 4 Sheets-Sheet 3

WILLIAM A. RAY,
INVENTOR.

BY John Flam
ATTORNEY

Sept. 4, 1951 W. A. RAY 2,567,123
SAFETY VALVE STRUCTURE FOR FUEL BURNERS
Filed Nov. 22, 1948 4 Sheets-Sheet 4
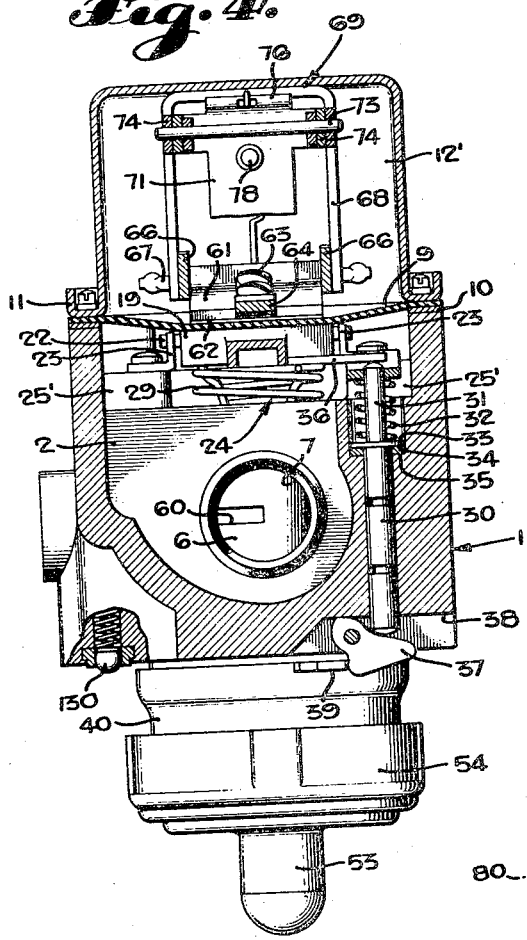
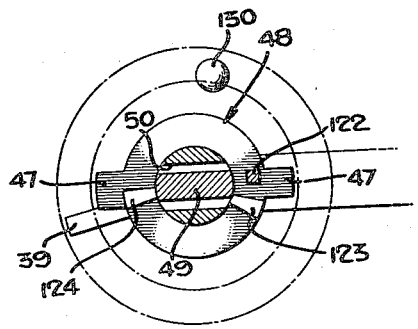
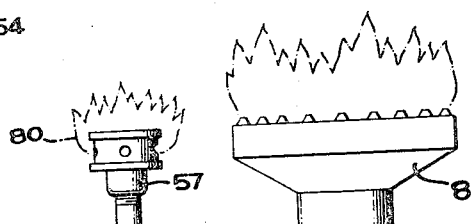
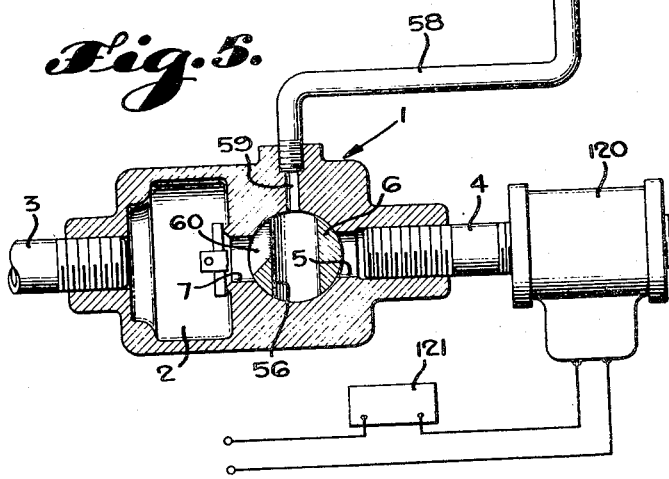
WILLIAM A. RAY, INVENTOR.
BY John Flam
ATTORNEY Patented Sept. 4, 1951

2,567,123

UNITED STATES PATENT OFFICE 2,567,123

SAFETY VALVE STRUCTURE FOR FUEL BURNERS

William A. Ray, North Hollywood, Calif., assignor to General Controls Co., a corporation of California Application November 22, 1948, Serial No. 61,505

6 Claims. (Cl. 137—144)

This invention relates to safety valves for controlling the flow of fuel to burners; and more particularly to automatic safety valves that prevent flow of fuel to a main burner in the event of failure of the pilot flame.

In a prior application, Serial No. 55,119, filed October 18, 1948, in the name of William A. Ray and entitled: "Automatic Safety Valve for Fuel Burners," a valve of this general character is described. This application is a continuation in part of the said prior application.

The valve described in the prior application includes two closures, one of which is a main valve manually operable to supply fuel to a main burner. The other valve is a safety valve, and includes a closure that is biased to closed position and that can be latched in open position only when the pilot flame is established. Upon failure of the pilot flame, the safety valve closure moves to closed position, interrupting all flow of fuel. The main valve closure is shown in said prior application as a plug valve having a rotary plug closure. The plug closure is interconnected with the safety valve closure in such manner that the safety valve closure is opened by moving the main valve handle beyond the fully closed position. Thus, it is impossible to move the safety valve to open position until the main valve is closed. Furthermore, the plug has a passage to permit flow of fuel to the pilot burner when the safety valve is opened.

In order to reset the valve after a pilot flame failure, the main valve is turned to closed position; and continued turning of the handle causes the safety valve to open and to pass fuel to the pilot burner. The pilot is then ignited; and a heat or light responsive device, affected by the existence of the pilot flame, operates a latch to hold the safety valve open. The handle for the main valve may now be released. This handle or operating member has a slight lost motion with respect to the plug; therefore, a spring can return the handle to a position where the handle no longer holds the valve open, and without requiring any movement of the plug. In this way it is assured that frictional resistance against turning of the plug will not interfere with the return of the handle or operating member away from safety valve opening position. Upon failure of the pilot flame, the safety valve closure is released and the flow of fuel is entirely interrupted.

In the form illustrated in said prior application, the latch for the safety valve is moved by an electromagnet energized by a thermocouple influenced by the heat of the pilot flame.

It is one of the objects of this invention to obviate the necessity of using an electromagnet for operating the latch, and to substitute therefor a mechanically operated device using a medium that expands and contracts upon the application of heat from the pilot flame.

It is another object of this invention to simplify the structure of valves of this character.

This invention possesses many other advantages, and has other objects which may be made more clearly apparent from a consideration of several forms in which it may be embodied. Such forms are shown in the drawings accompanying and forming part of the present specification. These forms will now be described in detail, illustrating the general principles of the invention; but it is to be understood that such detailed description is not to be taken in a limiting sense, since the scope of the invention is best defined by the appended claims.

Referring to the drawings:

Fig. 2 is a view, similar to Fig. 1, illustrating the safety valve latched in open position by operation of the pilot burner;

Fig. 4 is a sectional view, taken along plane 4—4 of Fig. 1;

Fig. 5 is a diagrammatic sectional view, taken along plane 5—5 of Fig. 1, and illustrating the pilot and main burners;

Fig. 6 is a sectional view, taken along plane 6—6 of Fig. 1;

Fig. 7 is a pictorial view of one of the brackets used in connection with the invention.

Figure 1:
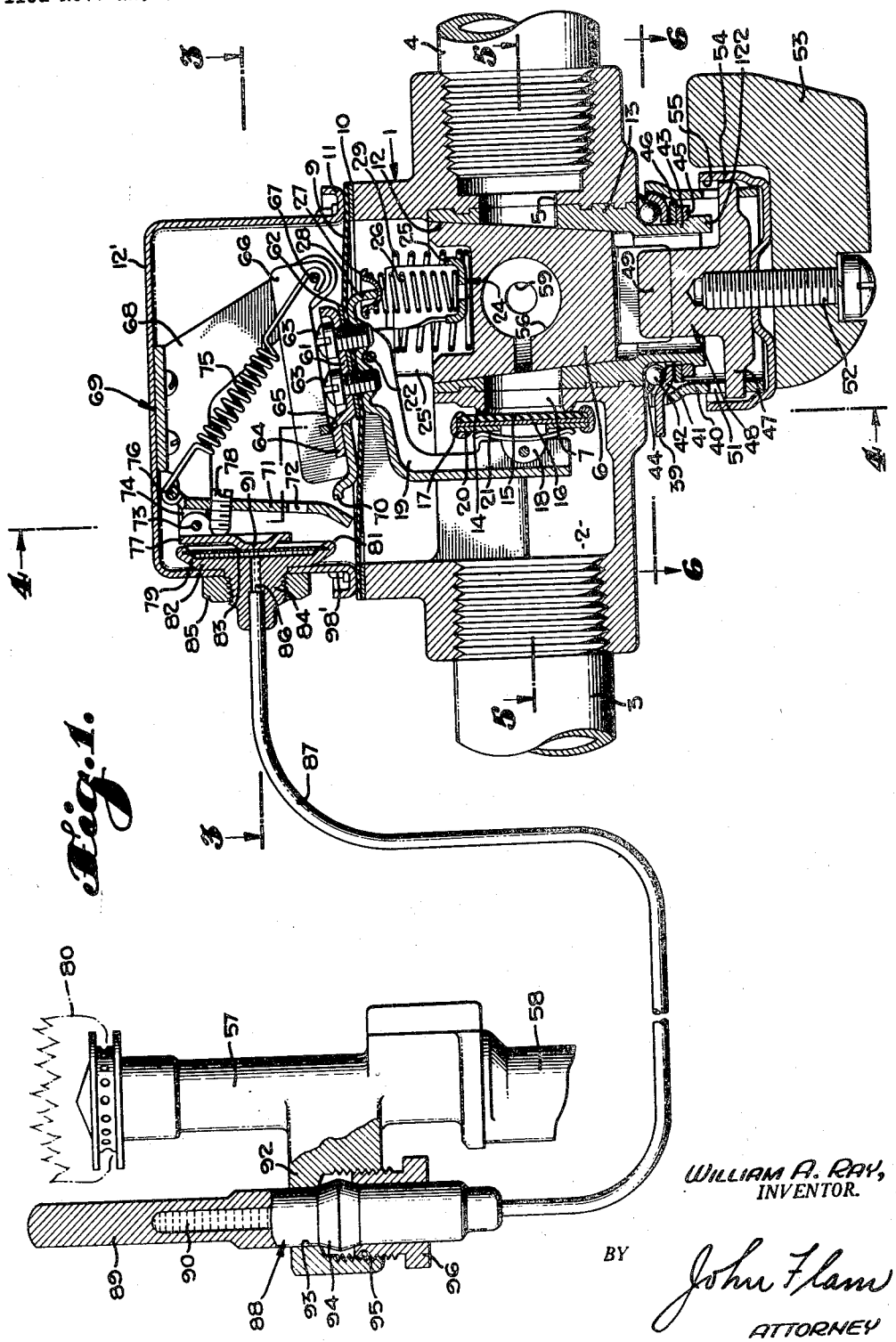
Figure 1 is a vertical section of a valve structure incorporating the invention in connection with a pilot burner, the safety valve being in closed position.

The valve structure proper, illustrated in Figs. 1, 2, 4 and 5, is substantially identical with that illustrated in the said prior application hereinabove referred to. It is shown as including a valve body 1 made, for example, as a die casting, and having an inlet chamber 2 open at the top. The inlet conduit 3 communicates with the chamber 2. The outlet conduit 4 communicates with a port 5 located in the wall of the body 1. This port 5 is controlled by the rotary tapered plug 6 which is adapted to be rotated by hand to an open or closed position. The operating means for rotating the rotary plug 6 will be described hereinafter.

The chamber 2 leads to a port 7 which is formed in that part of the body 1 that provides a tapered seat 12 for the plug 6. Accordingly, in order to pass fuel to outlet conduit 4 and to a main burner 8 (Fig. 5), it is necessary to turn the plug 6 in a clockwise direction; and it is necessary that the port 7 be open to the inlet chamber 2.

The body 1 has an open top which is sealed by a flexible diaphragm 9. This flexible diaphragm 9 rests upon a packing ring 10, and is urged to sealing relationship by the aid of a flange 11 of a supplemental housing or casing 12' extending above the diaphragm 9 and exteriorly thereof.

The plug 6 rests in the conical seat 12 defined by a seat-forming sleeve member 13. This sleeve member 13 may be appropriately cast into a corresponding aperture in the body 1.

The port 7 defines an annular tapered safety valve seat 14 at its left-hand end. A safety valve closure structure cooperates with the seat 14 optionally to close and open the port 7. This closure structure includes a resilient disc 15 (made of rubber or similar material). This disc 15 is held against a metal backing plate 16, as by a ring 17 that is turned inwardly at its edges. Plate 16 is provided with an ear 18 pivotally mounted on a lever 19 (Figs. 1, 2 and 4). A metal washer 20, through which the ear 18 passes, is urged against the backing member 16 by a bowed leaf spring 21. The left-hand convex edge of this leaf spring 21 is restrained by the ribs of the lever 19.

In the closed position of Fig. 1, the disc 15 engages the tapered seat 14, and the flow of fuel is interrupted between the inlet conduit 3 and the outlet conduit 4.

The lever 19 is pivoted upon a pin 22. This pin 22 is accommodated in ears 23 (Figs. 4 and 7) formed integrally with a bracket 24. This bracket 24 has a downwardly extending portion 25 that forms a cup to accommodate the lower end of a compression spring 26 that urges the lever 19 to valve closing position. The bracket 23 is attached to the bosses 25' formed integrally with the body 1.

The upper end of compression spring 26 urges a cup-like member 27 upwardly and into contact with a projection 28 formed on the end of the lever 19.

The plug 6 is urged against its seat 12 by the aid of a compression spring 29. The lower end of this spring 29 is seated in an appropriate recess in the top of the plug 6. Its upper end engages the cross arm of the bracket 24.

Opening of the safety valve closure structure to the position of Fig. 2 is effected by the aid of mechanism shown most clearly in Fig. 4. A push rod 30 is slidably mounted for vertical movement in the body 1 and has a reduced upper portion 31. This portion is guided by aperture 31' (Fig. 7) of bracket 24. Normally, the push rod 30 is urged downwardly out of operating position by the aid of a compression spring 32 surrounding the reduced portion 31. The upper end of this spring is confined by a portion of the bracket 24. Its lower end engages a washer 33 seated on the shoulder formed by the push rod 30 and the reduced portion 31. A packing washer 34 is seated in a recess 35 formed in the body 1.

Upon upward movement of the push rod 30 an arm 36 attached to the lever 19 is urged upwardly so as to rock the lever 19 in a counter-clockwise direction, as viewed in Fig. 1.

In order to urge the push rod 30 upwardly, use is made of a crank 37 pivotally mounted in a recess 38 of the body member 1. The crank 37 is actuated by an extension 39 (Figs. 1 and 4) carried by an operating handle structure shown most clearly in Fig. 1.

Thus, the handle structure includes a sleeve 40 having an enlarged skirt at its upper edge. The operating arm 39 extends through a slot in this skirt portion. It is formed integrally with an outer race 41. This outer race is joined to the inside of the sleeve 40 as by welding, so that rotation of the sleeve 40 causes corresponding movement of operating arm 39. Ball bearings 42 are confined by race 41 against the shoulder formed by the hollow extension 43 of the sleeve 13. A confining ring 44 is disposed around the ball bearings 42 and rests against the lower surface of the body 1. The outer race 41 is held in place by a split ring 45 that engages the washer 46.

The lower end of the sleeve 40 accommodates the transverse arms 47 of an actuator member 48. This actuating member 48 serves to rotate plug 6. For this purpose, it has a projection 49 (Figs. 1 and 6) which engages loosely in the slot 50 formed in the bottom of the plug 6. The arms 47 are urged tightly against the lower edge of the transverse openings 51 in sleeve 40 by the aid of a screw 52. This screw 52 passes through a manual operating handle 53, and is threaded into the member 48. A cover member 54 extends over the arm 47, and is provided with diametrically opposed recesses 55 within which the arms 47 engage.

Movement of the handle 53 thus causes a corresponding rotary movement of the sleeve 40. Upon a sufficient movement of the handle 53, the arm 39 engages the crank 37 (Fig. 4) and causes the safety valve structure to open. Upon release of the handle 53, the compression spring 32 (Fig. 4) urges the push rod 30 downwardly.

Unless the safety valve closure structure is held in the open position, either manually or by a latch, thus safety valve closure structure reassumes the closed position of Fig. 1, under the influence of spring 26.

As explained in the prior application hereinabove referred to, this safety valve opening movement can occur only while the plug 6 is in the closed position. This is also indicated in Fig. 6. Thus, as viewed in Fig. 5, the plug 6 has a transverse port 56 which, in the position shown, interrupts the flow of fuel between the inlet and the outlet openings. However, in this position, fuel may pass to the pilot burner 57 through conduit 58 when the safety valve structure is open. For this purpose a port 59 (Fig. 5) is used which communicates with the port 56 and thence with the slot 60 formed in the plug 6.

There is considerable lost motion between the projection 49 and the slot 50 (Fig. 6). Due to the lost motion, the force of spring 32 (Fig. 4) when handle 53 is released, urges the actuator to the central or inactive position without the necessity of rotating plug 6. Since the plug 6 is left stationary during this return movement, the friction between the plug and its seat 29 is ineffective to restrain movement of the actuator 48.

The plug 6, once the safety valve is opened and held in open position, can be turned in a clockwise direction, as viewed in Fig. 5, to align port 56 with the ports 5 and 7. In that position the passage of fuel to the pilot burner is maintained through the slot 60. A ball detent 130 (Figs. 4 and 6) located in body 1 cooperates with arm 39 to provide a yielding resistance to clockwise movement of the plug 6 beyond fully open position. However, since the detent 130 may be depressed, the plug 6 may be turned to a fully inactive position by moving it a half revolution from the position of Fig. 5.

Figure 3:
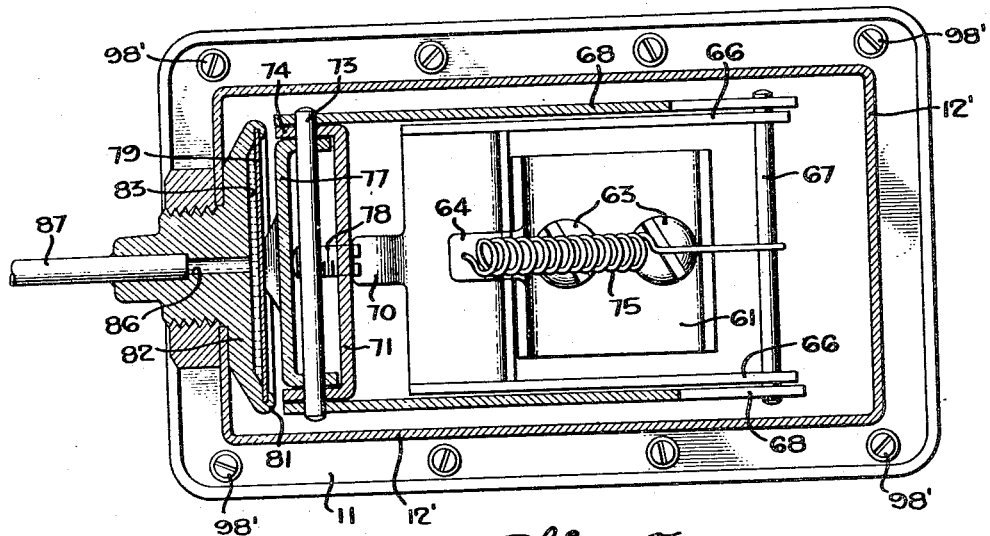
Fig. 3 is a sectional view, taken along plane 3—3 of Fig. 1.

In order to latch the safety valve structure in open position in response to the existence of the pilot flame at the pilot burner 57, use is made of a mechanism shown most clearly in Figs. 1, 2 and 3.

Thus, a clamp member 61 is attached to the lever 19. This member 61 is disposed exteriorly of the diaphragm 9, and a washer member 62 is interposed between the diaphragm 9 and the member 61. Screws 63, passing through the diaphragm, serve as the attaching means.

A tongue 64 is formed integrally with the member 61. It engages a slot 65 of a latching lever 66. This latching lever 66 is mounted on a pin 67 that is accommodated between the downwardly extending arms 68 of a bracket 69. This bracket 69 is appropriately fastened to the upper wall of the housing member 12.

The lever 66 has a latching projection 70. When the safety valve structure is moved to the open position of Fig. 2, this latching projection 70 is in a position to be engaged by a cooperating latching member 71. This latching member 71 has an aperture 72 in which the projection 70 engages. Latching member 71 is pivoted on a pin 73 extending through the projecting ears 74 of the bracket 68. The latching member 71 is urged to disengaging position by a tension spring 75. The lower end of this spring 75 is anchored around the pin 67. Its upper end engages around an anchor 76 extending upwardly from the latching member 71.

In order to urge the latching member 71 toward the right to engaging position, use is made of a supplemental lever 77. This lever 77 is pivotally mounted upon pin 73, and can be urged in a counter-clockwise direction against headless adjusting screw 78 threaded into the latching member 71. This screw 78 permits accurate relative positioning of the two latching members 66 and 71.

In turn, the lever 77 is arranged to be moved by the flexing of a diaphragm 79 that operates in response to the existence of the pilot flame 80, shown in Fig. 2. For this purpose, the diaphragm 79 forms one wall of a closed space filled with an expanding fluid, such as mercury. Thus, the diaphragm 79 is firmly secured in place in a flange 81 of a fluid space forming member 82. This member has a wall that forms a space 83 back of the diaphragm 79. Member 82 has a threaded extension 84 which projects through an aperture in the casing 12. A nut 85, exterior of the casing 12, engages extension 84 and thus serves to hold the member 82 firmly in position.

Communicating with the space 83 is a port 86 in member 82. A metal tube 87 is firmly affixed into the port 86. The other end of the tube 87 is firmly attached to the bottom of a cell structure 88. This cell structure 88 is hollow and has a solid projection 89 which is influenced by the heat of the pilot flame 80 issuing from the burner 57. Expansible fluid or liquid 90, such as mercury, fills the closed space formed by the space 83, the tube 87, and the hollow cell 89. When the pilot flame 80 is in existence, as shown in Fig. 2, sufficient heat is transferred through the mass of the upper projection 89 to cause the mercury body 90 to expand and to urge the diaphragm 79 to the right. This, in turn, causes the lever 77 and the latching member 71 to move to the latching position of Fig. 2. A projection 91 formed on the lever 79 contacts the central portion of the diaphragm 79.

The mercury column is considerably below the flame 80. Accordingly, it is heated mainly by conduction through projection 89. Thus, an excessive heat transfer to the mercury column is prevented.

The cell 88 can be securely held in a bracket 92 formed integrally with the burner 57. This bracket has an aperture 93 thorugh which the cell passes. A bevelled flange 94 projects into the threaded opening 95. A hollow screw 96 surrounds the lower portion of the cell 88, and is threaded into the opening 95. In this way, the bevelled flange 94 is urged firmly against the edge of the aperture 93.

The arrangement is such that the entire casing 12, with the associated parts, can be removed as a unit with respect to the member 61. For this purpose, when the screws 98' holding the casing against the body 1 are removed, the casing can be moved toward the left, as viewed in Fig. 1, to cause disengagement of the tip 64 from the aperture 65. Then the entire casing, with the latching parts, can be removed as a unit for replacement or repair.

In operative position, the safety valve structure is held in the open position shown in Fig. 2. The pilot flame 80 transfers sufficient heat to the mercury column 90 to cause the diaphragm 79 to bulge outwardly and to hold the latching member 71 in latching position. In this position the plug 6 can be rotated by the aid of the handle 53 to fully open position, and fuel can be supplied to the main burner 8 through an electromagnetically operated valve 120 (Fig. 5) and a control switch 121 such as a thermostat.

Upon failure of the pilot flame 80, the mercury colum 90 cools and the latch is urged to the releasing position by the spring 75. The safety valve then closes, due to the force exerted by the compression spring 26.

In order to reset the mechanism, the plug 6 must be turned to the off position indicated in Fig. 5. Further turning of the handle 53 causes the safety valve to be opened in the following manner: projection 39 engages the crank arm 37, causing upward movement of the push rod 30 against the force of the spring 32; the reduced portion 31 of the rod contacts the arm 36 which is in turn attached to the lever 19, and thereby urges the lever 19 in a clockwise direction as seen in Fig. 1, thereby unseating the safety valve closure structure. Unseating of the safety valve permits the passage of fuel to the pilot burner 57 through the slot 60 of the plug 6, port 59, and conduit 58, as shown in Fig. 5. Fuel is now supplied to the pilot burner 57 and it may be ignited. Holding the mechanism in resetting position causes positioning of the latching projection 70 through the actuation of the latching lever 66 by rotation of the clamp member 61 with the lever arm 19, by the connection effected by tongue 64 and slot 65. Shortly after the ignition of the pilot burner, the mercury 90 expands and causes movement of the diaphragm 79, the supplemental lever 77, and the latching member 71, thereby positioning the latching recess 72 thereof for engagement by the latching projection 70, thereby holding the safety valve open. The plug 6 can then be turned to a position where it supplies fuel both to the pilot burner 57 and the main burner 8.

As shown most clearly in Fig. 6, the actuator 48 is provided with a stop abutment 122 that limits the angular movement of the actuator between stops 123, 124 formed on the projection 41 of sleeve 13. In this way, the valve plug 6 can be moved only through the desired controlling angles.

Figure 8:
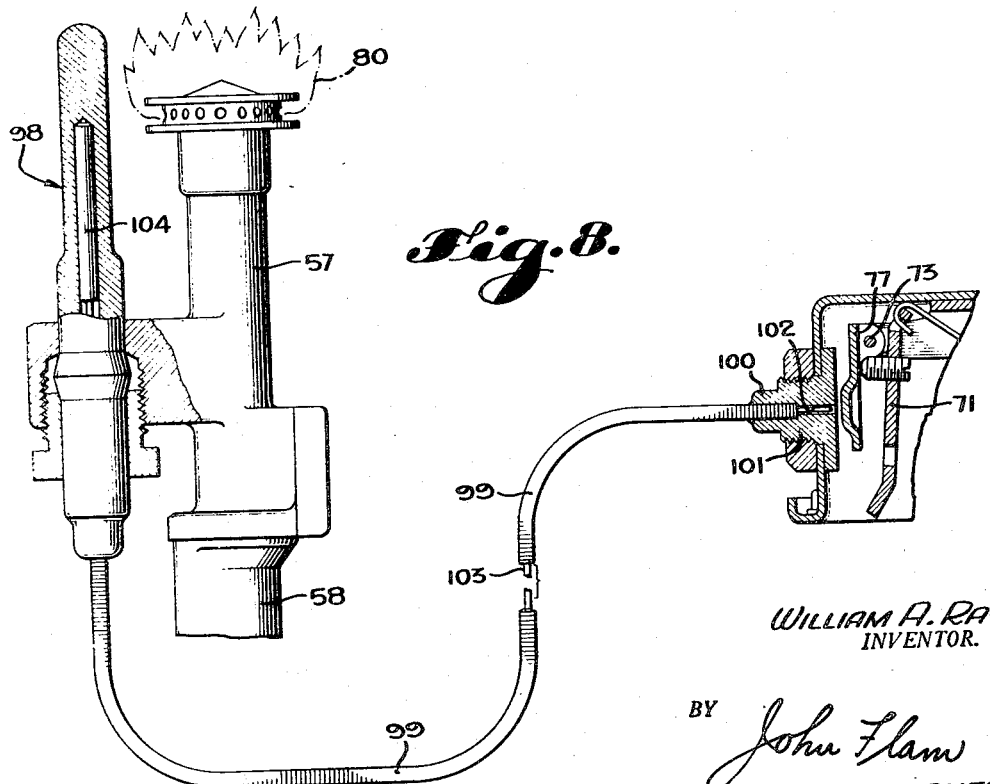
Fig. 8 is a fragmentary view, similar to Fig. 1, of a modified form of the invention.

In the form just described, a fluid medium 90 is utilized which expands under the influence of heat to latch the mechanism. Other forms of heat-responsive devices, however, may be used. One such form is shown in Fig. 8.

In this form, cell 98, similar to cell 88, is provided, supported in the same manner as before. A flexible cable 99 is attached at one end to the lower portion of the member 98. At its right-hand end it is attached, as by soldering, to the porjection 100 of a member 101, similar to member 83 of Fig. 1. This member 101 has an aperture 102 for the passage of a Bowden wire 103. This Bowden wire 103 directly contacts the lever 77. Its other end is attached to an expanding member 104, which is inserted within the hollow portion of the cell 98. This member 104 may be in the form of an expanding rod having a high temperature coefficient. Accordingly, when the pilot flame is in existence, the rod 104 expands and urges the wire 103 downwardly to cause movement of the latching lever 71.

The inventor claims:

1. In a valve structure: a valve body providing a plug valve seat and having inlet and outlet ports opening in said seat and transversely thereof; a rotary plug having a transverse port and rotatable in said seat to establish and interrupt communication between the inlet and outlet ports; an operator for rotating the plug; a flexible wall defining with the body a chamber into which one of said ports opens; a safety valve closure structure cooperating with the edge of the said one of the ports for controlling the passage of fluid between said port and the chamber; said safety valve closure structure including an arm, a pivot in the chamber for the arm, and a closure carried by the arm; means urging the arm toward valve closing position; means for rotating the arm in valve opening direction and operated by movement of the plug operator beyond plug valve closing position; and a latching mechanism for maintaining the arm in safety valve opening position, comprising: a member mounted externally of the flexible wall upon the arm; a first latch element actuated by said member; a second cooperating movable latch element for engaging said first latch element; and heat responsive means for moving said second latch element into engaging position.

2. In a valve structure: a valve body providing a plug valve seat and having inlet and outlet ports opening in said seat and transversely thereof; a rotary plug having a transverse port and rotatable in said seat to establish and interrupt communication between the inlet and outlet ports; an operator for rotating the plug; a flexible wall defining with the body a chamber into which one of said ports opens; a safety valve closure structure cooperating with the edge of the said one of the ports for controlling the passage of fluid between said port and the chamber; said safety valve closure structure including an arm, a pivot in the chamber for the arm, and a closure carried by the arm; means urging the arm toward valve closing position; means for rotating the arm in valve opening direction and operated by movement of the plug operator beyond plug valve closing position; and a latching mechanism for maintaining the arm in safety valve opening position, comprising: a member mounted externally of the flexible wall upon the arm; a first pivotally mounted latch element actuated by said member; a second cooperating pivotally mounted latch element for engaging said first latch element; said latching elements being transversely movable with respect to each other; a supplemental lever for actuating said second latching element; adjustable spacing means between said supplemental lever and said second latching lever; a movable wall for moving said supplemental lever; and heat responsive means for moving said movable wall.

3. In a valve structure: a valve body providing a plug valve seat and having inlet and outlet ports opening in said seat and transversely thereof; a rotary plug having a transverse port and rotatable in said seat to establish and interrupt communication between the inlet and outlet ports; an operator for rotating the plug; a flexible wall defining with the body a chamber into which one of said ports opens; a safety valve closure structure cooperating with the edge of the said one of the ports for controlling the passage of fluid between said port and the chamber; said safety valve closure structure including an arm, a pivot in the chamber for the arm, and a closure carried by the arm; means urging the arm toward valve closing position; means for rotating the arm in valve opening direction and operated by movement of the plug operator beyond plug valve closing position; and a latching mechanism for maintaining the arm in safety valve opening position, comprising: a member mounted externally of the flexible wall upon the arm; a first pivotally mounted latch element actuated by said member; a second cooperating pivotally mounted latch element for engaging said first latch element; said latching elements being transversely movable with respect to each other; heat responsive means for moving said second latch element into engaging position; and adjustable spacing means between said heat responsive means and said second latch element.

4. In a valve structure: a valve body providing a plug valve seat and having inlet and outlet ports opening in said seat and transversely thereof; a rotary plug having a transverse port and rotatable in said seat to establish and interrupt communication between the inlet and outlet ports; an operator for rotating the plug; a flexible wall defining with the body a chamber into which one of said ports opens; a safety valve closure structure cooperating with the edge of the said one of the ports for controlling the passage of fluid between said port and the chamber; said safety valve closure structure including an arm, a pivot in the chamber for the arm, and a closure carried by the arm; means urging the arm toward valve closing position; means for rotating the arm in valve opening direction and operated by movement of the plug operator beyond plug valve closing position; and a latching mechanism for maintaining the arm in safety valve opening position, comprising: a member mounted externally of the flexible wall upon the arm; a first pivotally mounted latch element actuated by said member; a second cooperating pivotally mounted latch element for engaging said first latch element; said latching elements being transversely movable with respect to each other; means biasing said latching elements away from engaging position; heat responsive means for moving said second latch element into engaging position; and adjustable spacing means between said heat responsive means and said second latch element.

5. In a valve structure: a valve body providing a plug valve seat having an inlet and an outlet port opening in said seat; a rotary plug having a through port and rotatable in said seat to establish and interrupt communication between the inlet and outlet ports; an operator for rotating the plug; a flexible wall defining with the body a chamber into which one of said ports opens; a safety valve closure structure cooperating with the edge of the said one of the ports for controlling the passage of fluid between said port and the chamber, said safety valve closure structure including an arm, and a closure carried by the arm; means urging the arm toward valve closing position; and a latching mechanism for maintaining the arm in safety valve opening position, comprising: a member mounted externally of the flexible wall upon the arm; a first pivotally mounted latch element actuated by said member; a second pivotally mounted latch element for engaging said first latch element; said latching elements being transversely movable with respect to each other; means biasing said latching elements away from latching position; a supplemental lever for actuating said second latching element; adjustable spacing means between said supplemental lever and said second latching lever; a movable wall for moving said supplemental lever; and heat responsive means for moving said movable wall.

6. In a valve structure: a valve body providing a plug valve seat having an inlet and an outlet port opening in said seat; a rotary plug having a through port and rotatable in said seat to establish and interrupt communication between the inlet and outlet ports; an operator for rotating the plug; a flexible wall defining with the body a chamber into which one of said ports opens; a safety valve closure structure cooperating with the edge of the said one of the ports for controlling the passage of fluid between said port and the chamber, said safety valve closure structure including an arm, and a closure carried by the arm; means urging the arm toward valve closing position; and a latching mechanism for maintaining the arm in safety valve opening position, comprising: a member mounted externally of the flexible wall upon the arm; a first pivotally mounted latch element movable to latching position by said member; a second pivotally mounted latch element for engaging said first latch element; said latching elements being transversely movable with respect to each other; means biasing said second latching element away from latching position; and heat responsive means for operating said second latching element to latching position.

WILLIAM A. RAY.

REFERENCES CITED

The following references are of record in the file of this patent:

UNITED STATES PATENTS

| Number | Name | Date |
|---|---|---|
| 1,773,817 | Leach | Aug. 26, 1930 |
| 1,823,122 | Partlow | Sept. 15, 1931 |
| 1,850,646 | Ross-Watt | Mar. 22, 1932 |
| 1,943,075 | Horton | Jan. 9, 1934 |
| 1,981,012 | Wegener | Nov. 20, 1934 |
| 2,257,024 | Ray | Sept. 23, 1941 |
| 2,318,823 | Wantz | May 11, 1943 |
| 2,403,611 | Ray | July 9, 1946 |